(12) United States Patent
Yue et al.

(10) Patent No.: US 10,235,595 B2
(45) Date of Patent: Mar. 19, 2019

(54) VALUE BILL IDENTIFYING METHOD

(71) Applicant: GRG Banking Equipment Co., Ltd., Guangzhou, Guangdong (CN)

(72) Inventors: Xuyao Yue, Guangdong (CN); Zhuming Xiao, Guangdong (CN); Dandan Wang, Guangdong (CN); Xiaoqun Huang, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/564,936

(22) PCT Filed: Apr. 6, 2016

(86) PCT No.: PCT/CN2016/078566
§ 371 (c)(1),
(2) Date: Oct. 6, 2017

(87) PCT Pub. No.: WO2016/165574
PCT Pub. Date: Oct. 20, 2016

(65) Prior Publication Data
US 2018/0101749 A1 Apr. 12, 2018

(30) Foreign Application Priority Data
Apr. 13, 2015 (CN) .......................... 2015 1 0176330

(51) Int. Cl.
*G06K 9/46* (2006.01)
*G07D 7/2033* (2016.01)
(Continued)

(52) U.S. Cl.
CPC ......... *G06K 9/4652* (2013.01); *G06K 9/2018* (2013.01); *G06K 9/46* (2013.01);
(Continued)

(58) Field of Classification Search
CPC .......... G07D 7/20; G07D 7/00; G07D 7/2033; G06T 7/001; G06K 9/4652; G06K 9/46;
(Continued)

(56) References Cited

U.S. PATENT DOCUMENTS 6,011,866 A * 1/2000 Donelly ............... G06K 9/6203
382/135
6,798,900 B1 * 9/2004 Sugata ..................... G06K 9/46
194/207
(Continued)

FOREIGN PATENT DOCUMENTS

CN 102 890 840 A 1/2013
EP 1 944 737 A1 7/2008

OTHER PUBLICATIONS

Written Opinion of the International Searching Authority for Application No. PCT/CN2016/078566 dated Jul. 12, 2016.
(Continued)

*Primary Examiner* — Kenny A Cese
(74) *Attorney, Agent, or Firm* — Wolf, Greenfield & Sacks, P.C.

(57) ABSTRACT

Provided is a value bill identifying method, which includes: step 1, collecting, by a color collection device including multiple color sensors, color data of a to-be-detected value bill and preprocessing the collected color data; step 2, extracting a feature from the preprocessed color data; step 3, matching the extracted feature with feature template sets corresponding to each type of value bills, to obtain matching scores, and regarding a feature template with the highest score as a matched template of the color data; and step 4, determining a type of the value bill based on a matching result.

14 Claims, 3 Drawing Sheets

(51) Int. Cl.
*H04N 1/60* (2006.01)
*G06K 9/20* (2006.01)
*G06K 9/62* (2006.01)

(52) U.S. Cl.
CPC ......... *G06K 9/4642* (2013.01); *G06K 9/6214* (2013.01); *G07D 7/2033* (2013.01); *H04N 1/6025* (2013.01)

(58) Field of Classification Search
CPC .. G06K 9/2018; G06K 9/4642; G06K 9/6214; H04N 1/6025
See application file for complete search history.

(56) References Cited

U.S. PATENT DOCUMENTS

| | | | |
|---|---|---|---|
| 9,483,895 | B2 | 11/2016 | Zhu et al. |
| 2004/0247169 | A1 | 12/2004 | Ross et al. |
| 2005/0207634 | A1* | 9/2005 | Jones ................ G06Q 20/18 382/135 |
| 2006/0115139 | A1 | 6/2006 | Joshi et al. |
| 2007/0274573 | A1* | 11/2007 | Hori ................ G06K 9/00234 382/118 |
| 2008/0069423 | A1* | 3/2008 | Liu ...................... G06K 9/346 382/137 |
| 2010/0128964 | A1 | 5/2010 | Blair |
| 2010/0128965 | A1 | 5/2010 | Blair |

OTHER PUBLICATIONS

PCT/CN2016/078566, Jul. 12, 2016, Written Opinion of the International Searching Authority.
EP 16779549.1, May 22, 2018, Extended European Search Report.
Extended European Search Report for Application No. EP 16779549.1 dated May 22, 2018.

* cited by examiner

VALUE BILL IDENTIFYING METHOD

The application is a National Stage application of PCT international patent application PCT/CN2016/078566, filed on Apr. 6, 2016 which claims priority to Chinese Patent Application No. 201510176330.0, titled "VALUE BILL IDENTIFYING METHOD", filed on Apr. 13, 2015 with the State Intellectual Property Office of the People's Republic of China, both of which applications are incorporated herein by reference in their entireties.

TECHNICAL FIELD

The present disclosure relates to the technology of value bill identification, and in particular to a value bill identifying method.

BACKGROUND

In the conventional art, an identifying method for a value bill is usually carried out by collecting image features through a contact image sensor. In the field of image-based pattern identification, it is necessary to collect to-be-identified images by using a sensor. If image resolution is insufficient, the correctness of the identifying result will be greatly reduced, especially between to-be-identified objects which are easy to be confused, such as "O" and "D" in character identification. Although the computer technology changes rapidly, a very high-end hardware platform will not be chosen in considerations of cost, the hardware platform is chosen only to satisfy actual demand. In this case, in practice, due to differences between hardware and the diversity of identification space, more objects which are easy to be confused will be identified wrongly. Thus, an identifying method based on color data is developed to identify a type of a value bill.

The color data refers to a set of values of three colors of R, G and B which is collected by a color sensor. It is an intuitive and fast method to identify a value bill based on color data of the value bill. A process for identifying color data includes two parts, which are feature extraction and identification, and the robustness of the extracted feature directly affects the accuracy of identification. The extraction of color features mainly has the following problems. On one hand, since the color data is a result of a common effect of color in a certain region of a value bill, when the surface of a signal acquisition area is non-solid-colored, the color data will have a greater deviation from the true color. On the other hand, for a same color acquisition area, different textures have different reflected intensities, which cause the color sensor to receive signals of different intensities, resulting in instability of the color data.

For the above reasons, features obtained from the feature extraction are difficult to be robust, resulting in the inability to accurately identify the type of the value bill.

SUMMARY

In order to solve the problem in the conventional art that, in a value bill identifying method based on color data, color feature is difficult to be robust, resulting in a low identifying accuracy, a value bill identifying method based on color data is provided according to the present disclosure. In the method according to the present disclosure, a value bill is identified by using a trend change in a stable sub-segment mean set of color data, to solve the problem of color shift of the color data, and the value bill is accurately identified.

A value bill identifying method includes:

step 1, collecting, by a color collection device including multiple color sensors, color data of a to-be-detected value bill and preprocessing the collected color data;

step 2, extracting a feature from the preprocessed color data, where the feature extracted from the color data is a one-dimensional vector including means of all sub-segments with smaller hue variation in hue data corresponding to the color data;

step 3, matching the extracted feature with feature template sets corresponding to each type of value bills, to obtain matching scores, and regarding a feature template with the highest score as a matched template of the color data, where a front orientation image and a back orientation image of a color bill are divided into multiple sub-regions, simulated color data of each of the sub-regions is obtained by simulating an operation mode of a color sensor, a feature of the simulated color data of each of the sub-regions is a feature template, and a set of feature templates corresponding to the sub-regions in the front orientation image and the back orientation image of a color value bill is the feature template set corresponding to the value bill; and step 4, determining a type of the value bill based on a matching result.

Preferably, before step 1, the value bill identifying method further includes a step of pre-setting multiple the feature template sets corresponding to each type of value bills, and in the step, extracting the feature template set corresponding to the value bill from a true color bill image includes:

step 01, dividing, based on complexity of image information, a color image in an orientation of the bill into multiple sub-regions;

step 02, converting each of the divided sub-regions into color data by simulating an operation mode of a color sensor;

step 03, performing color space conversion on the converted color data, to obtain hue data of the region;

step 04, positioning a stable sub-segment in the hue data;

step 05, calculating a hue mean of the stable sub-segment;

step 06, constituting, by hue means of all stable sub-segments, a feature template corresponding to the region; and step 07, constituting, by feature templates corresponding to all the sub-regions in the orientation, a feature template set corresponding to the orientation of the bill, and constituting, by feature template sets corresponding to all orientations of the bill, the feature template set corresponding to the bill.

Specifically, in the step 03, simulated color data is converted into a HSL color space, hue data SH of color data SS is obtained and expressed as follows:

$$SH = \{sh_0, sh_1, \ldots sh_j, \ldots sh_L\}(1 \leq j < L),$$

a converting method is described as follows:

$$sh_j = \begin{cases} 60 \times \dfrac{g_j - b_j}{Max - Min}, & Max = r_j \\ 60 \times \dfrac{b_j - r_j}{Max - Min} + 120, & Max = g_j \\ 60 \times \dfrac{r_j - g_j}{Max - Min} + 240, & Max = b_j \end{cases}.$$

Specifically, in the step 04, the positioning the stable sub-segment in the hue data includes:

calculating an integral image, expressed as follows, of the hue data SH:

$$SMAP_i=\{smap_0, smap_1, \ldots smap_j, \ldots smap_L\}$$
$$(1 \leq j \leq L),$$

where, $$smap_j = \begin{cases} sh_j, & j=0 \\ sh_j + map_{j-1}, & else \end{cases};$$

and searching for the stable sub-segment in the hue data by a sliding window method, where a stable sub-segment set in a signal SH is set to:

$$SPART_i=\{spart_0, spart_1, \ldots spart_s, \ldots spart_{SP}\}$$
$$(1 \leq s \leq SP),$$

SP is the number of stable sub-segments in the signal SH, $spart_s$ may be expressed as:

$$spart_s=\{st_s, end_s\},$$

$st_s$ and $end_s$ respectively represent a starting position and an end position of the stable sub-segment, $st_s$ is the first 1 value meeting a following formula:

$$st_s = \text{firstl}(abs(2 \times map_{l+step/2} - (map_{l+step} - map_l)) < thres),$$
$$(end_{s-1} < l < L),$$

$end_s$ is the last 1 value meeting a following formula:

$$end_s = \text{lastl}\left(abs\left(\frac{map_l - map_{st_s}}{l - st_s} - \frac{map_{st_s+step} - map_{st_s}}{step}\right) < thres\right),$$
$$\text{and } (st_s + step/2 < l < L)$$

thres is a preset threshold for determining signal stability of a segment.

Specifically, in the step 05, a mean $f_s$ of each stable sub-segment is expressed as:

$$f_s = \frac{map_{end_s} - map_{st_s}}{end_s - st_s};$$

the hue means of all the stable sub-segments constitute the feature template corresponding to the region, expressed as:

$$F_i=\{f_0, f_1, \ldots, f_s, \ldots, f_{P_i}\}(1 \leq s \leq SP);$$

and features of the simulated color data of each of the regions are extracted to form a front orientation feature set and a back orientation feature set of a banknote, expressed as:

$$SF^+=\{Sf_0, Sf_1, \ldots, Sf_k, \ldots, Sf_{K^+}\},$$

$$SF^-=\{Sf_0, Sf_1, \ldots, Sf_k, \ldots, Sf_{K^-}\},$$

where $$Sf_k=\{sf_0, sf_1, \ldots, sf_u, \ldots, sf_{Q_k^+}\}(0<u<Q_k^+),$$

$$Sf_k=\{sf_0, sf_1, \ldots, sf_v, \ldots, sf_{Q_k^-}\}(0<v<Q_k^-).$$

Preferably, in the step 1, the preprocessing the color data includes:

positioning a starting point and an end point of an effective region of the color data, to position data collected in a banknote by a color sensor; and filtering the positioned color data to filter noise, where the preprocessed color data is expressed as:

$$S_i=\{R_i, G_i, B_i\}(1 \leq i \leq M),$$

$$R_i=\{r_{i,0}, r_{i,1}, \ldots r_{i,j}, \ldots r_{i,N_i}\}(1 \leq j \leq N_i),$$

$$G_i=\{g_{i,0}, g_{i,1}, \ldots g_{i,j}, \ldots g_{i,N_i}\}(1 \leq j \leq N_i),$$

$$B_i=\{b_{i,0}, b_{i,1}, \ldots b_{i,j}, \ldots b_{i,N_i}\}(1 \leq j \leq N_i),$$

where, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

Preferably, in the step 2, the extracting the feature from the preprocessed color data includes:

step 21, performing color space conversion on the preprocessed color data, to obtain hue data;

step 22, positioning a stable sub-segment set in the hue data, where a stable sub-segment is a segment with smaller hue variation; and step 23, calculating a hue mean of the stable sub-segment, where hue means of all sub-segments in the stable sub-segment set constitute a feature vector of the color data, the feature vector Fi is expressed as:

$$F_i=\{f_{i,0}, f_{i,1}, \ldots, f_{i,s}, \ldots, f_{i,P_i}\}(1 \leq s \leq P_i),(1 \leq i \leq N),$$

and N is the number of the color sensors.

Preferably, in the step 3, when matching is performed on the feature template sets corresponding to each type of bills, the matching is performed on a front orientation template set and a back orientation template set of the template set corresponding to the bill, and the matching is performed in a front direction and a back direction, a front direction matching degree between a color data feature Fi and a feature $Sf_k$ of a template is described as:

$$score_{i,k} = \begin{cases} 0, & P_i \neq Q_k^{flag} \\ 1.0, & P_i = Q_k^{flag} = 1 \\ \sum_{z=1}^{P_i} \frac{S(z)}{P_i}, & P_i = Q_k^{flag} \end{cases},$$

flag is a sign of a front orientation template and a back orientation template, S(z) is expressed as follows, and T is a preset threshold:

$$S(z) = \begin{cases} 1, & abs(f_z - f_{z-1}) < T \text{ and } abs(sf_z - sf_{z-1}) < T \\ 1, & f_z > f_{z-1} \text{ and } sf_z > sf_{z-1} \\ 1, & f_z < f_{z-1} \text{ and } sf_z < sf_{z-1} \\ 0, & else \end{cases}$$

a back direction matching degree between a color data feature $F_i$ and a feature $Sf_k$ of a template is described as:

$$score_{i,k} = \begin{cases} 0, & P_i \neq Q_k^{flag} \\ 1.0, & P_i = Q_k^{flag} = 1 \\ \sum_{z=1}^{P_i} \frac{S'(z)}{P_i}, & P_i = Q_k^{flag} \end{cases}$$

flag is a sign of a front orientation template and a back orientation template, S(z) is expressed as follows, and T is a preset threshold:

$$S'(z) = \begin{cases} 1, & \text{abs}(f_{P_i-z-1} - f_{P_i-z}) < T \text{ and } \text{abs}(sf_z - sf_{z-1}) < T \\ 1, & f_{P_i-z-1} > f_{P_i-z} \text{ and } sf_z > sf_{z-1} \\ 1, & f_{P_i-z-1} < f_{P_i-z} \text{ and } sf_z < sf_{z-1} \\ 0, & \text{else} \end{cases}$$

Preferably, the step 3 further includes:

step 31, obtaining distances among the multiple color sensors based on position information of the color sensors in the color collection device, where the position information of the color sensors refers to relative positions among the color sensors obtained based on structure information of the color collection device;

step 32, obtaining distances among matched feature templates based on position information of the matched feature templates, where the position information of the feature templates refers to relative positions among centers of divided sub-regions obtained in obtaining the feature template set; and step 33, determining whether the distances among the matched feature templates are consistent with the distances among corresponding color sensors, and determining that the matching is successful in a case that the distances among the matched feature templates are consistent with the distances among corresponding color sensors, and determining that the matching is not successful in a case that the distances among the matched feature templates are not consistent with the distances among corresponding color sensors.

Specifically, in the step 33, a similarity degree between the distances among the color sensors and the distances among corresponding matched templates is calculated according to following formulas:

$$Similarity = \sum_{i=0}^{M-1} \frac{cmp(i)}{M-1},$$

$$cmp(i) = \begin{cases} 1, & DistM_{i,i+1} - DistS_{i,i+1} < T_{dist} \\ 0, & \text{else} \end{cases},$$

$DistS_{i,j}$ is a distance between a color sensor corresponding to color data i and a color sensor corresponding to color data j, $DistM_{i,j}$ is a distance between a matched template of the color data i and a matched template of the color data j, $T_{dist}$ is a preset distance threshold, and it is determined that the matching is successful in a case that the similarity degree is greater than a preset threshold $T_{sim}$, and it is determined that the matching is not successful in a case that the similarity degree is not greater than the preset threshold $T_{sim}$.

In the value bill identifying method according to the present disclosure, firstly, a feature template set is generated based on a bill image; then color data is preprocessed; then the color data is converted into hue data, and a set of a mean of each stable sub-segment in the hue data forms a feature of the color data; and a feature extracted from the color data is matched with the feature template set, and finally a bill type of the value bill is obtained. According to the present disclosure, the value bill is identified by using a trend change of a stable sub-segment mean set of color data, so that the problem of color shift of the color data can be overcome, and the value bill is accurately identified. According to the present disclosure, an operation principle of a color sensor is simulated, and a method of extracting simulated color data from a color bill image and forming a feature template set has advantages of a high performing speed and practicability. In the present disclosure, a template matching method is adopted to identify, a matching result is confirmed by comparing distances among color sensors and distances among matched templates, and finally accurate identification is achieved. Therefore the method has advantages of a high performing speed and effectiveness.

DETAILED DESCRIPTION OF THE EMBODIMENTS

Embodiments of the present disclosure provide a banknote identifying method based on color data, for identifying a banknote by matching collected color data and a feature template set extracted from a known true color banknote image.

It should be noted that, a value bill identifying method based on color data according to the embodiments of the present disclosure can be used to not only identify banknotes, but also identify slice files, such as checks, which is not limited herein. The method according to the embodiments of the present disclosure will be described below by taking banknote identification as an example, the description of the banknote identification is only taken as an example, which should not be taken as limitation to the method of the present disclosure.

Figure 1:
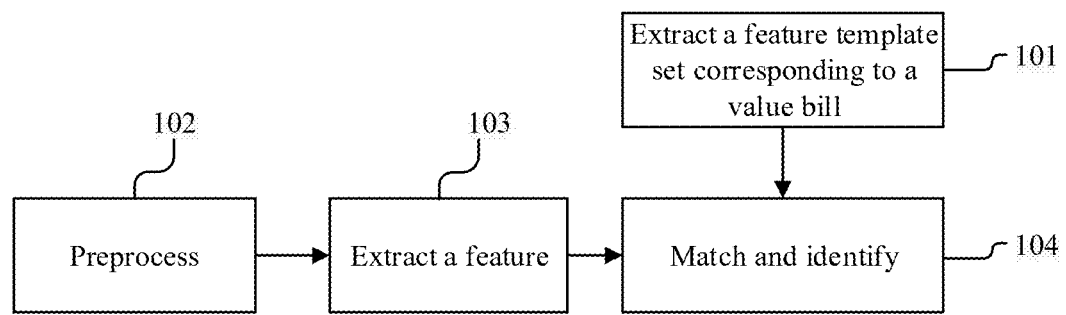
FIG. 1 is a flow chart of a value bill identifying method based on color data according to an embodiment of the present disclosure.

Referring to FIG. 1, the banknote identifying method based on color data according to an embodiment of the present disclosure includes steps 101 to 104.

In step 101, a feature template set corresponding to a banknote is extracted.

A color image in an orientation of the banknote is dividing into multiple sub-regions based on complexity of image information. Each of the divided sub-regions is converted into color data by simulating an operation mode of a color sensor. Color space conversion is performed on the converted color data, to obtain hue data of the region. A stable sub-segment in the hue data is positioned. A hue mean of the stable sub-segment is calculated. Hue means of all stable sub-segments constitute a feature template corresponding to the region. Feature templates corresponding to all the sub-regions in the orientation constitute a feature template set corresponding to the orientation of the banknote, and feature template sets corresponding to all orientations of the banknote constitute the feature template set corresponding to the banknote.

In step 102, color data is pre-processed.

A starting point and an end point of an effective region of the color data are positioned, and data collected in a banknote by a color sensor is positioned. The positioned color data is filtered, to filter noise.

In step 103, a feature is extracted from the color data.

Color space conversion is performed on the preprocessed color data to obtain hue data. A stable sub-segment set in the hue data is positioned, a stable sub-segment is a segment with smaller hue variation. A hue mean of the stable sub-segment is calculated, hue means of all sub-segments in the stable sub-segment set constitute a feature vector of the color data.

In step 104, matching and identifying is performed.

The feature of the color data is matched with each feature template of the feature template set, to obtain a matching score. A feature template with the highest score is regarded as a matched template of the color data. Distances among the multiple color sensors are obtained based on position information of the color sensors, the position information of the color sensors refers to relative positions among the color sensors obtained based on structure information of the color collection device. Distances among matched feature templates are obtained based on position information of the matched feature templates, the position information of the feature templates refers to relative positions among centers of divided sub-regions obtained in obtaining the feature template set. It is determined whether the distances among the matched feature templates are consistent with the distances among corresponding color sensors, and it is determined that the matching is successful in a case that the distances among the matched feature templates are consistent with the distances among corresponding color sensors, and it is determined that the matching is not successful in a case that the distances among the matched feature templates are not consistent with the distances among corresponding color sensors.

Since an inputting orientation of a banknote is unknown, it is necessary to respectively match with a front orientation template set and a back orientation template set of a banknote template set when the banknote template set is matched. In addition, since an inputting direction of the banknote is unknown, it is necessary to respectively match in a front direction and a back direction when the template set in each orientation is matched.

It should be noted that, step 101 of extracting a feature template set corresponding to a banknote may be performed independently of other steps, that is, after a feature template set corresponding to each type of banknotes is extracted in advance, it is not necessary to extract the feature template set corresponding to each type of banknotes each time in a process of identification on a to-be-detected banknote, and the feature template set corresponding to each type of banknote, which is extracted in advance and stored in an identification system, may be used repeatedly.

The embodiment will be described in detail hereinafter.

In step 101, the feature template set corresponding to a banknote is extracted.

1. The banknote image is divided into regions.

Figure 3:
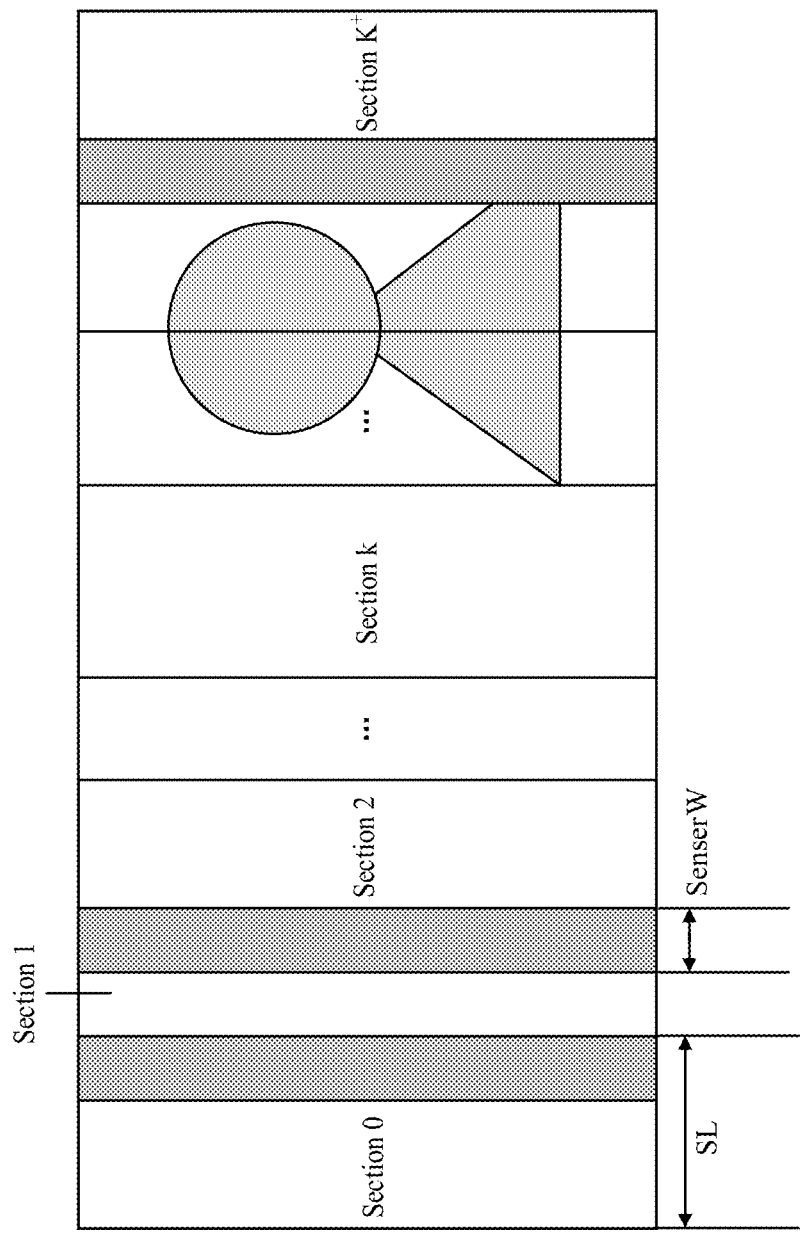
FIG. 3 is a schematic diagram for dividing regions on a front orientation image of a banknote in a portion of extracting a feature template set of a value bill according to an embodiment of the present disclosure.

Based on complexity of the banknote image, a front orientation and a back orientation of the banknote are evenly divided into $K^+$ and $K^-$ regions, respectively. FIG. 3 is a schematic diagram of a front orientation division view of a banknote, and SL is a width of each region. In order to prevent a matched template can not found in a case that the color sensor collects color data in a crossing way, there is an overlapping region between two adjacent parts when the front orientation is divided, and a length of the overlapping region is a width of a collection surface of the color sensor, that is, SenserW.

2. A simulated color sensor signal is generated.

Figure 4:
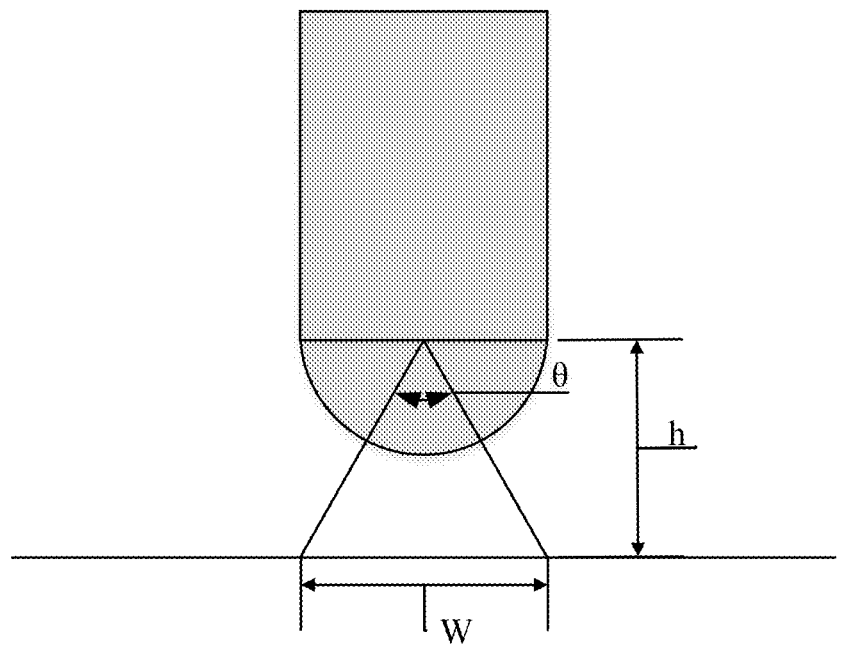
FIG. 4 is a schematic diagram for calculating a receiving width of a color sensor.

As shown in FIG. 4, an effective collection surface of the color sensor is determined by a distance h between a sensor and a banknote surface, and an effective collection angle θ. A height of the effective collection surface is expressed as:

$$W = 2h \times \tan(\theta/2).$$

Figure 5:
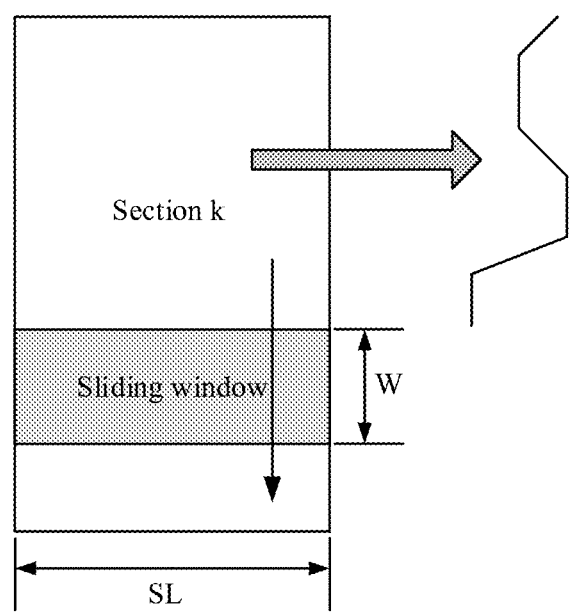
FIG. 5 is a schematic diagram for simulating a process, of a color sensor collecting a signal, by a sliding window method in a portion of extracting a feature template set of a value bill.

As shown in FIG. 5, for section k, a sliding window with a width of SL and a height of W is moved gradually. A Color mean of all pixels in the window is a simulated signal value of a current position. After the window is slid, simulated color data of a current region is obtained.

3. A feature template set corresponding to a banknote is extracted.

Feature extraction is performed on the simulated color data generated in step 2, to obtain features of simulated color data of each sub-region, and finally a feature set corresponding to the front orientation of the banknote and a feature set corresponding to back orientation of the banknote are formed, which is described as follows.

(1) Feature Extraction

The simulated color data generated in step 2 is RGB data. Signal intensity of each sampling point is described by three parameters, which is difficult to process and is susceptible to brightness. Therefore, the simulated color data is converted to HSL space, and feature extraction is performed on hue data corresponding to the simulated color data. For color data SS obtained from a divided region, feature extraction may be described as follows.

1) Color Space Conversion

The simulated color data is converted into a HSL color space, to obtain hue data SH of the color data SS, and the hue data SH is expressed as follows:

$$SH = \{sh_0, sh_1, \ldots sh_j, \ldots sh_L\}(1 \leq j < L).$$

A converting method is described as follows:

$$sh_j = \begin{cases} 60 \times \dfrac{g_j - b_j}{\text{Max} - \text{Min}}, & \text{Max} = r_j \\ 60 \times \dfrac{b_j - r_j}{\text{Max} - \text{Min}} + 120, & \text{Max} = g_j \\ 60 \times \dfrac{r_j - g_j}{\text{Max} - \text{Min}} + 240, & \text{Max} = b_j \end{cases}$$

2) Sub-Segment Search

After conversion, a search for stable sub-segments in the hue data may be executed as follows.

An integral image of the hue data SH is calculated and the integral image is expressed as follows:

$$SMAP_i = \{smap_0, smap_1, \ldots smap_j, \ldots smap_L\} \\ (1 \leq j < L),$$

where, $$smap_j = \begin{cases} sh_j, & j = 0 \\ sh_j + smap_{j-1}, & \text{else} \end{cases},$$

the stable sub-segments in the hue data is searched in a sliding window method.

A stable sub-segment set in a signal SH is set to:

$$SPART_i=\{spart_0, spart_1, \ldots spart_s, \ldots spart_{SP}\}$$
$$(1 \leq s \leq SP),$$

where, SP is the number of stable sub-segments in the signal SH, $spart_s$ may be expressed as:

$$spart_s=\{st_s, end_s\},$$

and $st_s$ and $end_s$ respectively represent a starting position and an end position of the stable sub-segment, $st_s$ is the first l value meeting a following formula:

$$st_s = \text{first}l(\text{abs}(2 \times map_{l+step/2} - (map_{l+step} - map_l)) < thres),$$
$$(end_{s-1} < l < L),$$

Figure 2:
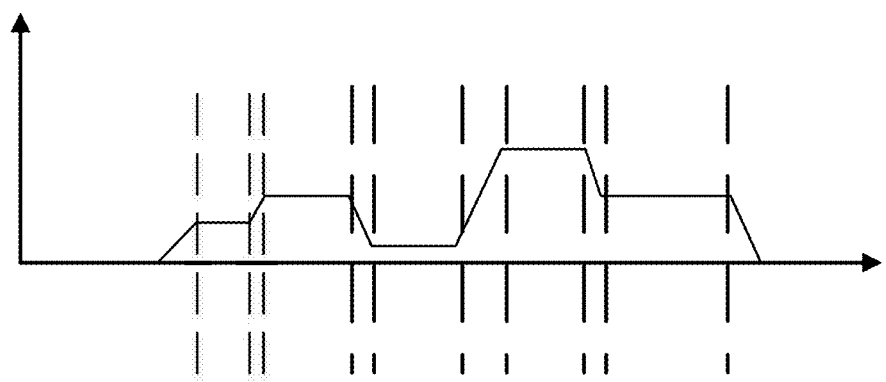
FIG. 2 is a schematic diagram for segmenting hue data according to an embodiment of the present disclosure.

$end_s$ is the last l value meeting a following formula:

$$end_s = lastl\left(\text{abs}\left(\frac{map_l - map_{st_s}}{l - st_s} - \frac{map_{st_s+step} - map_{st_s}}{step}\right) < thres\right),$$
$$(st_s + step/2 < l < L)$$

thres is a preset threshold for determining signal stability of a segment. FIG. 2 is a schematic diagram showing a case after the simulated data is segmented.

3) Feature Extraction

Features of the simulated data may be expressed as:

$$F_i=\{f_0, f_1, \ldots f_s, \ldots f_{P_i}\}(1 \leq s < SP),$$

where, $f_s$ is a mean of each of the stable sub-segments, that is:

$$f_s = \frac{map_{end_s} - map_{st_s}}{end_s - st_s}.$$

(2) Generation of a Feature Template Set

Using the same feature extraction method as the method used in the step (1), features of simulated color data of each region are extracted, to form a front orientation feature set and a back orientation feature set of a banknote, expressed as:

$$SF^+=\{Sf_0, Sf_1, \ldots, Sf_k, \ldots, Sf_{K^+}\},$$

$$SF^-=\{Sf_0, Sf_1, \ldots, Sf_k, \ldots, Sf_{K^-}\}.$$

where, $$Sf_k=\{sf_0, sf_1, \ldots, sf_u, \ldots, sf_{Q_k^+}\}(0 \leq u < Q_k^+),$$

$$Sf_k=\{sf_0, sf_1, \ldots, sf_v, \ldots, sf_{Q_k^-}\}(0 \leq v < Q_k^-).$$

In step 102, preprocessing is performed.

The preprocessing includes positioning a starting point and an end point of the color data by a preset threshold, and performing median filtering with a window of 5 on the color data, to filter out influence of noise, such as electromagnetic interference, on the color data.

The pre-processed color data is expressed as:

$$S_i=\{R_i, G_i, B_i\}(1 \leq i \leq M),$$

$$R_i=\{r_{i,0}, r_{i,1}, \ldots r_{i,j}, \ldots r_{i,N_i}\}(1 \leq j \leq N_i),$$

$$G_i=\{g_{i,0}, g_{i,1}, \ldots g_{i,j}, \ldots g_{i,N_i}\}(1 \leq j \leq N_i),$$

$$B_i=\{b_{i,0}, b_{i,1}, \ldots b_{i,j}, \ldots b_{i,N_i}\}(1 \leq j \leq N_i).$$

where, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

In step 102, feature extraction is performed.

Referring to the feature extraction method of the simulated color data in step 101, features are extracted from real collected color data, expressed as:

$$F_i=\{f_{i,0}, f_{i,1}, \ldots f_{i,s}, \ldots f_{i,P_i}\}(1 \leq s < P_i), (1 \leq i \leq N).$$

where, N is the number of color sensors.

In step 104, matching and identifying are performed.

(1) Template Matching

The feature of each of the color data is matched with a front orientation feature template set and a back orientation feature template set of a feature template set corresponding to a banknote, a template with a highest matching score is a matched template, and position information of the matched template is recorded. Since an inputting direction of a banknote is unknown, it is necessary to respectively match in a front direction and a back direction when one orientation of the banknote is matched.

A front direction matching degree between a color data feature $F_i$ and a feature $Sf_k$ of a template is described as:

$$score_{i,k} = \begin{cases} 0, & P_i \neq Q_k^{flag} \\ 1.0, & P_i = Q_k^{flag} = 1, \\ \sum_{z=1}^{P_i} \frac{S(z)}{P_i}, & P_i = Q_k^{flag} \end{cases}$$

flag is a sign of a front orientation template and a back orientation template, $S(z)$ is expressed as follows, and T is a preset threshold:

$$S(z) = \begin{cases} 1, & \text{abs}(f_z - f_{z-1}) < T \text{ and } \text{abs}(sf_z - sf_{z-1}) < T \\ 1, & f_z > f_{z-1} \text{ and } sf_z > sf_{z-1} \\ 1, & f_z < f_{z-1} \text{ and } sf_z < sf_{z-1} \\ 0, & \text{else} \end{cases}$$

a back direction matching degree between a color data feature $F_i$ and a feature $Sf_k$ of a template is described as:

$$score_{i,k} = \begin{cases} 0, & P_i \neq Q_k^{flag} \\ 1.0, & P_i = Q_k^{flag} = 1 \\ \sum_{z=1}^{P_i} \frac{S'(z)}{P_i}, & P_i = Q_k^{flag} \end{cases}$$

flag is a sign of a front orientation template and a back orientation template, $S'(z)$ is expressed as follows, and T is a preset threshold:

$$S'(z) = \begin{cases} 1, & \text{abs}(f_{P_i-z-1} - f_{P_i-z}) < T \text{ and } \text{abs}(sf_z - sf_{z-1}) < T \\ 1, & f_{P_i-z-1} > f_{P_i-z} \text{ and } sf_z > sf_{z-1} \\ 1, & f_{P_i-z-1} < f_{P_i-z} \text{ and } sf_z < sf_{z-1} \\ 0, & \text{else} \end{cases}$$

(2) Position Information Comparison

After the template feature matching, a similarity degree between the distances among the color sensors and the distances among corresponding matched templates is calculated according to following formulas:

$$Similarity = \sum_{i=0}^{M-1} \frac{cmp(i)}{M-1},$$

$$cmp(i) = \begin{cases} 1, & DistM_{i,i+1} - DistS_{i,i+1} < T_{dist} \\ 0, & else \end{cases},$$

$DistS_{i,j}$ is a distance between a color sensor corresponding to color data i and a color sensor corresponding to color data j, $DistM_{i,j}$ is a distance between a matched template of the color data i and a matched template of the color data j, $T_{dist}$ is a preset distance threshold, and it is determined that the matching is successful in a case that the similarity degree is greater than a preset threshold $T_{sim}$, and it is determined that the matching is not successful in a case that the similarity degree is not greater than the preset threshold $T_{sim}$. In this way, identifying is completed.

According to the present disclosure, firstly, a feature template set is generated based on a bill image; then color data is preprocessed; then the color data is converted into hue data, a set of stable sub-segments in the color data are found by an integral image sliding window method, a mean hue of each sub-segment is calculated and a feature vector of the color data is formed. The feature extracted from the color data is matched with the feature template set, and finally an identifying result is obtained. According to the present disclosure, the banknote is identified by using a trend feature of the color data, so that the problem of color shift of the color data can be overcome effectively, and the banknote is accurately identified. The trend feature refers to a magnitude relationship between means of two adjacent stable sub-segments in the feature vector of the color data. According to the present disclosure, an operation principle of a color sensor is simulated, and a method of extracting simulated color data from a color bill image and forming a feature template set has advantages of a high performing speed and practicability. In the present disclosure, a template matching method is adopted to identify, a matching result is confirmed by comparing distances among color sensors and distances among matched templates, and finally accurate identification is achieved. Therefore the method has advantages of a high performing speed and effectiveness.

The above description shows only preferred embodiments of the present disclosure. It should be noted that, the above preferred embodiments should not be deemed as a limitation to the present disclosure, and the scope of the present disclosure is defined by the claims of the present disclosure. For the person skilled in the art, several improvements and modifications may be made to the present disclosure without departing from the spirit and scope of the present disclosure, and these improvements and modifications are also deemed to fall into the scope of the present disclosure.

The invention claimed is:

1. A value bill identifying method, comprising:
    step 1, collecting, by a color collection device comprising a plurality of color sensors, color data of a to-be-detected value bill and preprocessing the collected color data;
    step 2, performing color space conversion on the preprocessed color data, to obtain hue data, detecting a stable sub-segment set in the hue data, wherein a stable sub-segment is a segment with smaller hue variation, calculating a hue mean of the stable sub-segment, wherein hue means of all sub-segments in the stable sub-segment set constitute a feature vector of the color data, wherein the feature vector of the color data which is a one-dimensional vector constitutes a feature extracted from the color data;
    step 3, matching the extracted feature with feature template sets corresponding to each type of value bills, to obtain matching scores, and regarding a feature template with the highest score as a matched template of the color data, wherein a feature template set corresponding to one type of value bill is extracted from a true color bill image by following steps 01-07: step 01, dividing, based on complexity of image information, a color image in an orientation of the bill into a plurality of sub-regions; step 02, converting each of the divided sub-regions into color data by simulating an operation mode of a color sensor; step 03, performing color space conversion on the converted color data, to obtain hue data of the region; step 04, detecting a stable sub-segment in the hue data; step 05, calculating a hue mean of the stable sub-segment; step 06, constituting, by hue means of all stable sub-segments, a feature template corresponding to the region; and step 07, constituting, by feature templates corresponding to all the sub-regions in the orientation, a feature template set corresponding to the orientation of the bill, and constituting, by feature template sets corresponding to all orientations of the bill, the feature template set corresponding to the bill; and
    step 4, determining a type of the value bill based on a matching result.

2. The value bill identifying method according to claim 1, wherein before step 1, the value bill identifying method further comprises a step of pre-setting a plurality of the feature template sets corresponding to each type of value bills.

3. The value bill identifying method according to claim 1, wherein in the step 03, simulated color data is converted into a Hue Saturation Lightness (HSL) color space, hue data SH of color data SS is obtained and expressed as follows:

$$SH = \{sh_0, sh_1, \ldots sh_j, \ldots sh_L\}(1 \leq j \leq L),$$

a converting method is described as follows:

$$sh_j = \begin{cases} 60 \times \frac{g_j - b_j}{Max - Min}, & Max = r_j \\ 60 \times \frac{b_j - r_j}{Max - Min} + 120, & Max = g_j \\ 60 \times \frac{r_j - g_j}{Max - Min} + 240, & Max = b_j \end{cases}.$$

4. The value bill identifying method according to claim 3, wherein in the step 04, the positioning the stable sub-segment in the hue data comprises:
    calculating an integral image, expressed as follows, of the hue data SH:

$$SMAP_i = \{smap_0, smap_1, \ldots smap_j, \ldots smap_L\}$$
$$(1 \leq j \leq L),$$

wherein, $$smap_j = \begin{cases} sh_j, & j = 0 \\ sh_j + map_{j-1}, & else \end{cases};$$

and searching for the stable sub-segment in the hue data in a sliding window method, wherein a stable sub-segment set in a signal SH is set to:

$SPART_i = \{spart_0, spart_1, \ldots spart_s, \ldots spart_{SP}\}$
$(1 \leq s \leq SP)$, SP is the number of stable sub-segments in the signal SH, $spart_s$ may be expressed as:

$spart_s = \{st_s, end_s\}$, $st_s$ and $end_s$ respectively represent a starting position and an end position of the stable sub-segment, $st_s$ is the first l value meeting a following formula:

$st_s = \text{first} l(\text{abs}(2 \times \text{map}_{l+step/2} - (\text{map}_{l+step} - \text{map}_l)) < \text{thres})$,
$(end_{s-1} < l < L)$, $end_s$ is the last l value meeting a following formula:

$$end_s = \text{last} l\left(\text{abs}\left(\frac{\text{map}_l - \text{map}_{st_s}}{l - st_s} - \frac{\text{map}_{st_s+step} - \text{map}_{st_s}}{step}\right) < \text{thres}\right),$$

and
$(st_s + step/2 < l < L)$ thres is a preset threshold for determining signal stability of a segment.

5. The value bill identifying method according to claim 4, wherein, in the step 05, a mean $f_s$ of each stable sub-segment is expressed as:

$$f_s = \frac{\text{map}_{end_s} - \text{map}_{st_s}}{end_s - st_s};$$

the hue means of all the stable sub-segments constitute the feature template corresponding to the region, expressed as:

$F_i = \{f_0, f_1, \ldots, f_s, \ldots, f_{P_i}\}(1 \leq s \leq SP)$; and features of the simulated color data of each of the regions are extracted to form a front orientation feature set and a back orientation feature set of a banknote, expressed as:

$SF^+ = \{Sf_0, Sf_1, \ldots, Sf_k, \ldots, Sf_{K^+}\}$, $SF^- = \{Sf_0, Sf_1, \ldots, Sf_{k'}, \ldots, Sf_{K^-}\}$, wherein $Sf_k = \{sf_0, sf_1, \ldots, sf_u, \ldots, sf_{Q_k^+}\}(0 \leq u < Q_k^+)$, $Sf_{k'} = \{sf_0, sf_1, \ldots, sf_v, \ldots, sf_{Q_k^-}\}(0 \leq v < Q_k^-)$.

6. The value bill identifying method according to claim 1, wherein in the step 1, the preprocessing the color data comprises:

positioning a starting point and an end point of an effective region of the color data, to position data collected in a banknote by a color sensor; and filtering the positioned color data to filter noise, wherein the preprocessed color data is expressed as:

$S_i = \{R_i, G_i, B_i\}(1 \leq i \leq M)$, $R_i = \{r_{i,0}, r_{i,1}, \ldots r_{i,j}, \ldots r_{i,N_i}\}(1 \leq j \leq N_i)$, $G_i = \{g_{i,0}, g_{i,1}, \ldots g_{i,j}, \ldots g_{i,N_i}\}(1 \leq j \leq N_i)$, $B_i = \{b_{i,0}, b_{i,1}, \ldots b_{i,j}, \ldots b_{i,N_i}\}(1 \leq j \leq N_i)$, wherein, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

7. The value bill identifying method according to claim 6, wherein in the step 2, the feature vector Fi is expressed as:

$F_i = \{f_{i,0}, f_{i,1}, \ldots f_{i,s}, \ldots f_{i,P_i}\}(1 \leq s \leq P_i), (1 \leq i \leq N)$, and N is the number of the color sensors.

8. The value bill identifying method according to claim 7, wherein in the step 3, when matching is performed on the feature template sets corresponding to each type of bills, the matching is performed on a front orientation template set and a back orientation template set of the template set corresponding to the bill, and the matching is performed in a front direction and a back direction, a front direction matching degree between a color data feature Fi and a feature $Sf_k$ of a template is described as:

$$\text{score}_{i,k} = \begin{cases} 0, & P_i \neq Q_k^{flag} \\ 1.0, & P_i = Q_k^{flag} = 1, \\ \sum_{z=1}^{P_i} \frac{S(z)}{P_i}, & P_i = Q_k^{flag} \end{cases}$$

flag is a sign of a front orientation template and a back orientation template, S(z) is expressed as follows, and T is a preset threshold:

$$S(z) = \begin{cases} 1, & \text{abs}(f_z - f_{z-1}) < T \text{ and } \text{abs}(sf_z - sf_{z-1}) < T \\ 1, & f_z > f_{z-1} \text{ and } sf_z > sf_{z-1} \\ 1, & f_z < f_{z-1} \text{ and } sf_z < sf_{z-1} \\ 0, & \text{else} \end{cases}$$

a back direction matching degree between a color data feature $F_i$ and a feature $Sf_k$ of a template is described as:

$$\text{score}_{i,k} = \begin{cases} 0, & P_i \neq Q_k^{flag} \\ 1.0, & P_i = Q_k^{flag} = 1 \\ \sum_{z=1}^{P_i} \frac{S'(z)}{P_i}, & P_i = Q_k^{flag} \end{cases}$$

flag is a sign of a front orientation template and a back orientation template, S'(z) is expressed as follows, and T is a preset threshold:

$$S'(z) = \begin{cases} 1, & \text{abs}(f_{P_i-z-1} - f_{P_i-z}) < T \text{ and } \text{abs}(sf_z - sf_{z-1}) < T \\ 1, & f_{P_i-z-1} > f_{P_i-z} \text{ and } sf_z > sf_{z-1} \\ 1, & f_{P_i-z-1} < f_{P_i-z} \text{ and } sf_z < sf_{z-1} \\ 0, & \text{else} \end{cases}$$

9. The value bill identifying method according to claim 8, wherein the step 3 further comprises:

step 31, obtaining distances among the plurality of color sensors based on position information of the color sensors in the color collection device, wherein the position information of the color sensors refers to relative positions among the color sensors obtained based on structure information of the color collection device;

step 32, obtaining distances among matched feature templates based on position information of the matched feature templates, wherein the position information of the feature templates refers to relative positions among centers of divided sub-regions obtained in obtaining the feature template set; and step 33, determining whether the distances among the matched feature templates are consistent with the distances among corresponding color sensors, and determining that the matching is successful in a case that the distances among the matched feature templates are consistent with the distances among corresponding color sensors, and determining that the matching is not successful in a case that the distances among the matched feature templates are not consistent with the distances among corresponding color sensors.

10. The value bill identifying method according to claim 9, wherein in the step 33, a similarity degree between the distances among the color sensors and the distances among corresponding matched templates is calculated according to following formulas:

$$Similaruty = \sum_{i=0}^{M-1} \frac{cmp(i)}{M-1},$$

$$cmp(i) = \begin{cases} 1, & DistM_{i,i+1} - DistS_{i,i+1} < T_{dist} \\ 0, & else \end{cases},$$

$DistS_{i,j}$ is a distance between a color sensor corresponding to color data i and a color sensor corresponding to color data j, $DistM_{i,j}$ is a distance between a matched template of the color data i and a matched template of the color data j, $T_{dist}$ is a preset distance threshold, and it is determined that the matching is successful in a case that the similarity degree is greater than a preset threshold $T_{sim}$, and it is determined that the matching is not successful in a case that the similarity degree is not greater than the preset threshold $T_{sim}$.

11. The value bill identifying method according to claim 2, wherein in the step 1, the preprocessing the color data comprises:

positioning a starting point and an end point of an effective region of the color data, to position data collected in a banknote by a color sensor; and filtering the positioned color data to filter noise, wherein the preprocessed color data is expressed as:

$S_i = \{R_i, G_i, B_i\}(1 \leq i \leq M)$, $R_i = \{r_{i,0}, r_{i,1}, \ldots r_{i,j}, \ldots r_{i,N_i}\}(1 \leq j \leq N_i)$, $G_i = \{g_{i,0}, g_{i,1}, \ldots g_{i,j}, \ldots g_{i,N_i}\}(1 \leq j \leq N_i)$, $B_i = \{b_{i,0}, b_{i,1}, \ldots b_{i,j}, \ldots b_{i,N_i}\}(1 \leq j \leq N_i)$, wherein, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

12. The value bill identifying method according to claim 3, wherein in the step 1, the preprocessing the color data comprises:

positioning a starting point and an end point of an effective region of the color data, to position data collected in a banknote by a color sensor; and filtering the positioned color data to filter noise, wherein the preprocessed color data is expressed as:

$S_i = \{R_i, G_i, B_i\}(1 \leq i \leq M)$, $R_i = \{r_{i,0}, r_{i,1}, \ldots r_{i,j}, \ldots r_{i,N_i}\}(1 \leq j \leq N_i)$, $G_i = \{g_{i,0}, g_{i,1}, \ldots g_{i,j}, \ldots g_{i,N_i}\}(1 \leq j \leq N_i)$, $B_i = \{b_{i,0}, b_{i,1}, \ldots b_{i,j}, \ldots b_{i,N_i}\}(1 \leq j \leq N_i)$, wherein, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

13. The value bill identifying method according to claim 4, wherein in the step 1, the preprocessing the color data comprises:

positioning a starting point and an end point of an effective region of the color data, to position data collected in a banknote by a color sensor; and filtering the positioned color data to filter noise, wherein the preprocessed color data is expressed as:

$S_i = \{R_i, G_i, B_i\}(1 \leq i \leq M)$, $R_i = \{r_{i,0}, r_{i,1}, \ldots r_{i,j}, \ldots r_{i,N_i}\}(1 \leq j \leq N_i)$, $G_i = \{g_{i,0}, g_{i,1}, \ldots g_{i,j}, \ldots g_{i,N_i}\}(1 \leq j \leq N_i)$, $B_i = \{b_{i,0}, b_{i,1}, \ldots b_{i,j}, \ldots b_{i,N_i}\}(1 \leq j \leq N_i)$, wherein, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

14. The value bill identifying method according to claim 5, wherein in the step 1, the preprocessing the color data comprises:

positioning a starting point and an end point of an effective region of the color data, to position data collected in a banknote by a color sensor; and filtering the positioned color data to filter noise, wherein the preprocessed color data is expressed as:

$S_i = \{R_i, G_i, B_i\}(1 \leq i \leq M)$, $R_i = \{r_{i,0}, r_{i,1}, \ldots r_{i,j}, \ldots r_{i,N_i}\}(1 \leq j \leq N_i)$, $G_i = \{g_{i,0}, g_{i,1}, \ldots g_{i,j}, \ldots g_{i,N_i}\}(1 \leq j \leq N_i)$, $B_i = \{b_{i,0}, b_{i,1}, \ldots b_{i,j}, \ldots b_{i,N_i}\}(1 \leq j \leq N_i)$, wherein, M is the number of color sensors, and M should be greater than 1 for robustness of the method according to an embodiment of the present disclosure, $R_i$, $G_i$ and $B_i$ are respectively red, green and blue components of a signal, and $N_i$ is a signal length of color data i.

* * * * *